Sept. 20, 1955 H. J. SADLER ET AL Re. 24,063

PUMP CONSTRUCTION

Original Filed Oct. 27, 1952

INVENTORS
HARRY J. SADLER
ERNEST E. COOK

BY Merchant & Merchant
ATTORNEYS

United States Patent Office

Re. 24,063

Reissued Sept. 20, 1955

24,063

PUMP CONSTRUCTION

Harry J. Sadler and Ernest E. Cook, Minneapolis, Minn.

Original No. 2,666,394, dated January 19, 1954, Serial No. 312,992, October 27, 1952. Application for reissue October 8, 1954, Serial No. 461,300

12 Claims. (Cl. 103—117)

Matter enclosed in heavy brackets [ ] appears in the original patent but forms no part of this reissue specification; matter printed in italics indicates the additions made by reissue.

Our invention relates to pumps, and more particularly to improvements in relatively small high-pressure fluid pumps.

The primary object of our invention is the provision of novel means for automatically disconnecting the driving means for my novel pump from the drive shaft and the rotary impeller carried thereby—when said impeller is caused to bind due to frictional engagement with the housing, breakage, wear, or other conditions brought about by use. In this manner, more extensive damage to the impeller and pump housing is prevented.

A still further object of our invention is the provision of a device of the type immediately above described, wherein the driving head for the pump may be quickly and easily operatively reconnected to the drive shaft and impeller after the same have been disconnected due to the unusual conditions above described.

A still further object of our invention is the provision of a device of the class described which is inexpensive to produce and extremely fool-proof and durable.

The above and still further objects of our invention will become apparent from the following detailed specification, appended claims and attached drawings.

Referring to the drawings, wherein like characters indicate like parts throughout the several views.

Figure 1:
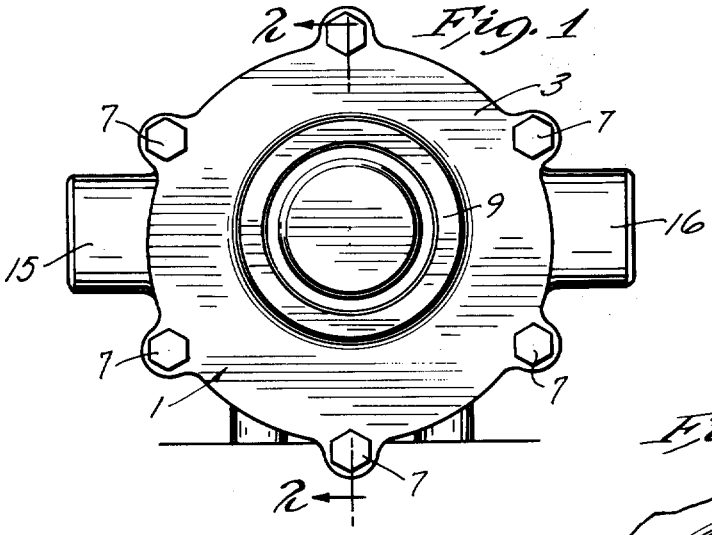
Fig. 1 is a view in side elevation of my pump.

Referring with greater particularity to the drawings, the numeral 1 indicates in its entirety a pump housing comprising a main section 2 and a cover plate section 3. As shown, the section 2 has a large circular bore 4 therein, and a laterally projecting bearing boss 5 with a reduced opening 6 therein which extends into the bore 4. Cover plate section 3 is secured to the main housing section 2 by means of circumferentially-spaced headed bolts 7, and provides, with said section 2, a cylindrical impeller chamber 8. The cover plate section 3 is provided with a laterally projecting bearing boss 9.

A drive shaft 10 extends eccentrically through the cylindrical chamber 8 and has its opposite end portions journalled for rotation in the opposed bearing bosses 5 and 9 of the housing [section] *sections* 2 and 3 respectively. Impeller element 11 is secured to the intermediate portion of the drive shaft 10 for rotation therewith within the chamber 8. The specific nature of the impeller element 11 does not form any part of our present invention, but, as shown, is of the type having rollers 12 mounted within circumferentially-spaced radially outwardly opening recess 13 in the periphery of the impeller 11. Roller elements 12 are adapted to work radially inwardly and outwardly of the recess upon rotation of the impeller 11 while engaging the cylindrical wall 14 of the chamber 8. The circumferentially-spaced inlet and outlet passages are identified by the numerals 15 and 16.

Preferably and as shown, an annular conventional pressure seal 17 is interposed between the housing section 2 and the drive shaft 10 within the bearing boss 5. Also, a conventional ball-bearing race 18 is provided to reduce friction between the drive shaft 10 and the bearing boss 5 to a minimum. A similar seal and bearing race, not shown, are provided within the bearing boss 9. As shown, the drive shaft 10 is tubular and has diametrically enlarged portions 19 and 20 which open axially outwardly at its opposite ends. The reduced central portion 21 provides an annular shoulder 22, against which the head portion 23 of a bolt 24 abuts. The opposite end of the bolt 24 is provided with screw-threads 25. As shown, the screw-threaded end 25 of the bolt 24 projects axially outwardly through the recess 20, whereby to provide an annular recess 26.

A cylindrical driving head 27 has a reduced axially extended end portion 28 which is telescopically received in the annular recess 26, the threaded portion 29 thereof receiving the threaded portion 25 of the bolt 24. It will be noted that the cooperating threaded portions 25 and 29 respectively of the bolt 24 and head 27 are such that the head 27 tends to unscrew itself from the bolt 24 under normal driving rotation, as indicated by the arrow in Fig. 3.

In order to operatively secure the driving head 27 to the drive shaft 10, we insert a shear-pin 30 in axially alignable openings 31 and 32 in the adjacent end portions of the shaft 10 and head 27 respectively. Preferably and as shown, the head 27 is provided with a plurality of circumferentially-spaced openings 32 which open into the bottom wall 33 of an axially outwardly opening socket 34.

Figure 3:
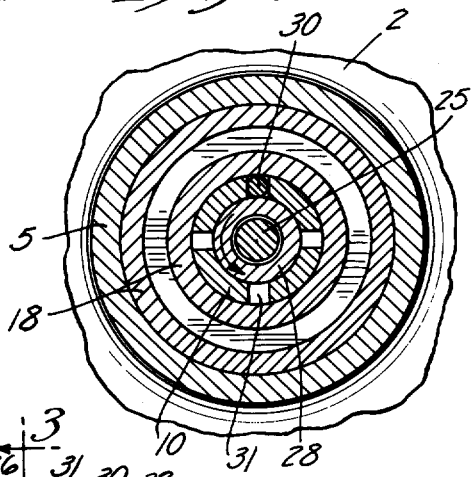
Fig. 3 is a view in vertical section taken on the line 3—3 of Fig. 2.
Figure 2:
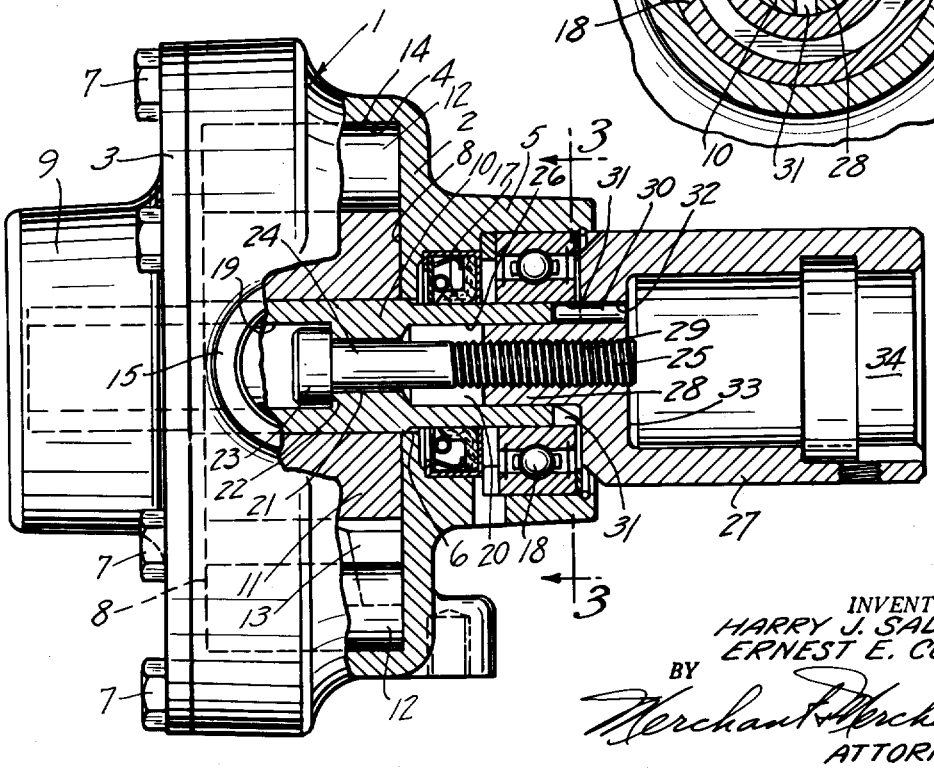
Fig. 2 is a view partly in end elevation, and partly in vertical axial section taken substantially on the line 2—2 of Fig. 1.

From the above it should be obvious that when the impeller 11, when subjected to abnormal friction, breakage, or the like, is rotated in the direction of the arrow on element 28 of Fig. 3, the pin 30 will shear, whereupon continued rotation of the driving head 27 will cause same to be unscrewed at least partially from the bolt 24. In this manner, any further rotation of the binding impeller 11 is terminated, and further damage is avoided. In the event that the binding is merely caused by undue friction, the head 27 may be reapplied to the threaded end 25 of the bolt 24 by first removing same therefrom, thereafter removing the sheared end portion of the shear-pin 30 from the recess 32 in the drive shaft 10, screwing the head 27 onto the screw-threaded end 25 of the bolt 24 in a clockwise direction until the recesses 31 and 32 are in alignment, and reinserting the shear-pin 30 into said aligned opening.

Our invention has been thoroughly tested and found to be completely satisfactory for the accomplishment of the above objects, and while we have illustrated a commercial embodiment thereof, it should be obvious that same is capable of modification without departure from the scope of the invention as defined by the appended claims.

What we claim is:

1. In a fluid pump, a housing comprising a main section and a cover plate section therefor, said housing defining a cylindrical chamber having circumferentially-spaced inlet and outlet passages, a drive shaft extending through said chamber eccentric to the axis thereof and having its opposite ends journalled for rotation in said housing sections, an impeller element on said shaft within said chamber, said drive shaft having an axial opening therethrough, a headed bolt extending through said opening, said bolt having a head at one end and terminating at its opposite end in screw-threads, said opening through said drive shaft having a diametrically enlarged portion providing an annular axially extended [opening] *recess* about said screw-threaded end, a rotary driving head having a diametrically reduced end portion telescopically receivable in said annular recess and having a central screw-threaded opening for the reception of the threaded end of said bolt, the direction of the threads on said bolt and driving head being such that said head tends to unscrew itself from said bolt under normal driving rotation, and a shear-pin rotated by said driving head and shaft and connecting same for common rotary movements.

2. The structure defined in claim 1 in which said driving head, and the adjacent end of said drive shaft, [is] *are* provided with axially extended [alignable] *aligned* openings for the reception of said shear-pin.

3. The structure defined in claim 1 in which said driving head defines a socket concentric with the axis of said drive shaft, the bottom of said socket and the adjacent end of said drive shaft having axially extended [alignable] *aligned* recesses for the reception of said shear-pin.

*4. In a fluid pump, a housing comprising a main section and a cover plate section therefor, said housing defining a cylindrical chamber having circumferentially spaced inlet and outlet passages, a drive shaft extending through said chamber eccentric to the axis thereof and having its opposite ends journalled for rotation in said housing sections, an impeller element on said shaft within said chamber, a driving head having an internally threaded end portion, a shear pin connecting said shaft and head for common rotary movement, an externally threaded separate member carried by said shaft and extending therefrom terminating at its outer end in a threaded portion, said member including restraining means limiting axial movement of said member in relation to said shaft, said end portion of said driving head being telescopically received by said shaft and threadedly engaging the threaded end portion of said member, the direction of the threads on the cooperating threaded portions of said member and head being such that said head will at least partially unscrew itself from said member when the pin is sheared.*

*5. The structure defined in claim 4, wherein said threaded member is a bolt having a head portion and said restraining means is the head thereof.*

*6. The structure defined in claim 4 in which said driving head, and the adjacent end of said drive shaft, are provided with axially extended aligned openings for the reception of said shear-pin.*

*7. The structure defined in claim 4 in which said driving head defines a socket concentric with the axis of said drive shaft, the bottom of said socket and the adjacent end of said drive shaft having axially extennded aligned recesses for the reception of said shear-pin.*

*8. In a fluid pump, a housing comprising a main section and a cover plate section therefor, said housing defining a cylindrical chamber having spaced inlet and outlet passages, a drive shaft extending through said chamber and having its opposite ends journalled for rotation in said housing sections, an impeller element on said shaft within said chamber, a driving head having a threaded end portion, a shear-pin connecting said shaft and head for common rotary movement, a separate threaded member carried by said shaft and extending therefrom terminating at its outer end in a threaded portion, said end portion of said driving head being telescopically received by said shaft and threadedly engaging the threaded end portion of said member, the direction of the threads on the cooperating threaded portions of said member and head being such that said head will at least partially unscrew itself from said member when the pin is sheared.*

*9. The structure defined in claim 8 in which said driving head, and the adjacent end of said drive shaft, are provided with axially extended aligned openings for the reception of said shear-pin.*

*10. The structure defined in claim 8 in which said driving head defines a socket concentric with the axis of said drive shaft, the bottom of said socket and the adjacent end of said drive shaft having axially extended aligned recesses for the reception of said shear-pin.*

*11. The structure defined in claim 8, wherein said threaded member includes restraining means limiting axial movement of said member in relation to said shaft.*

*12. The structure defined in claim 11, wherein said threaded member is a bolt having a head portion and said restraining means is the head thereof.*

References Cited in the file of this patent or the original patent

UNITED STATES PATENTS

| | | |
|---|---|---|
| 1,660,287 | Willers | Feb. 21, 1928 |
| 1,865,438 | Friedemann | July 5, 1932 |
| 2,049,797 | Bochmann et al. | Aug. 4, 1936 |
| 2,541,405 | Chapman | Feb. 13, 1951 |